May 12, 1953
H. A. MEARNS
2,638,069
PIPE ALIGNING DEVICE
Filed July 6, 1950
7 Sheets-Sheet 2
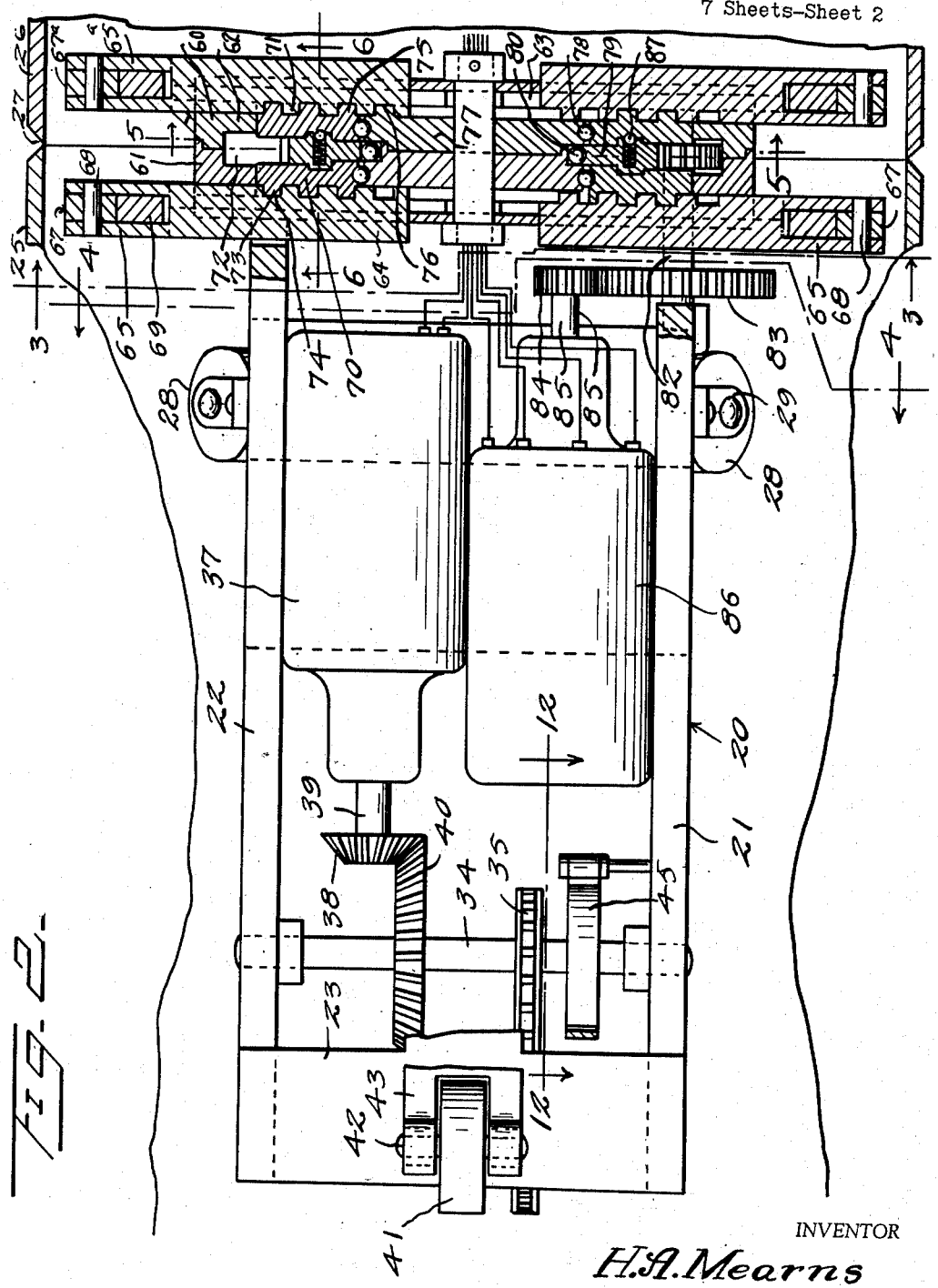
INVENTOR
H.A. Mearns
BY Kimmel & Crowell
ATTORNEYS

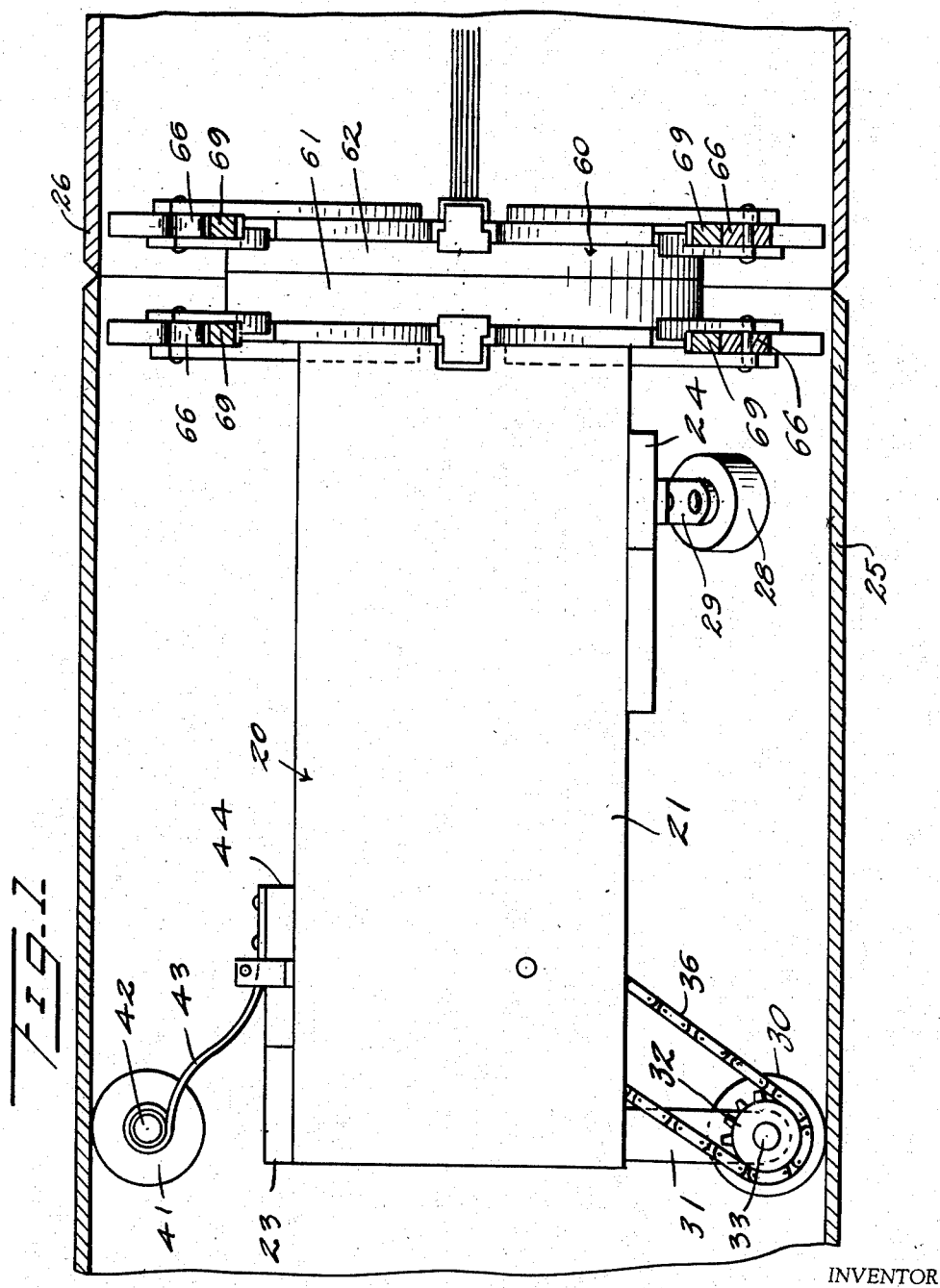

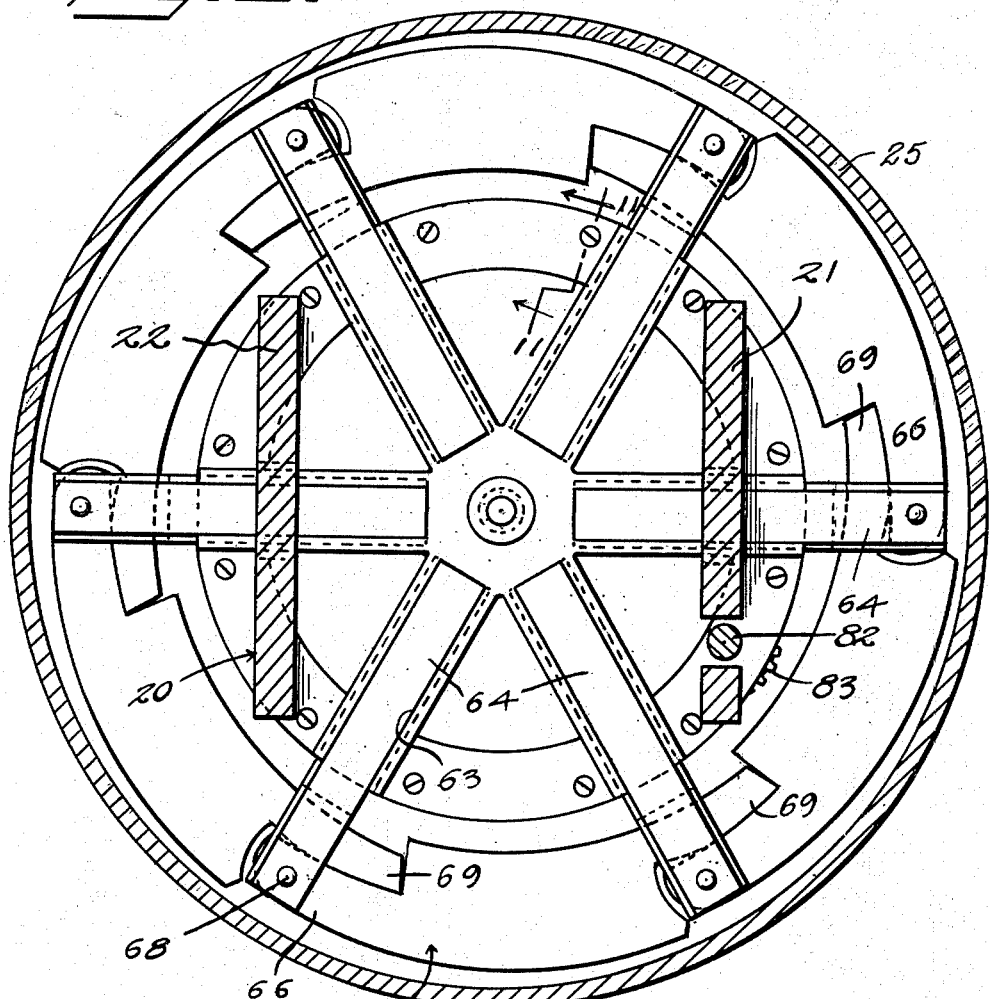
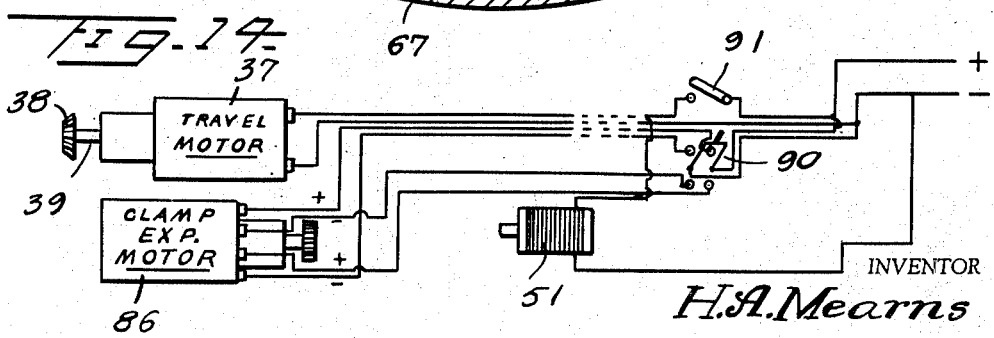

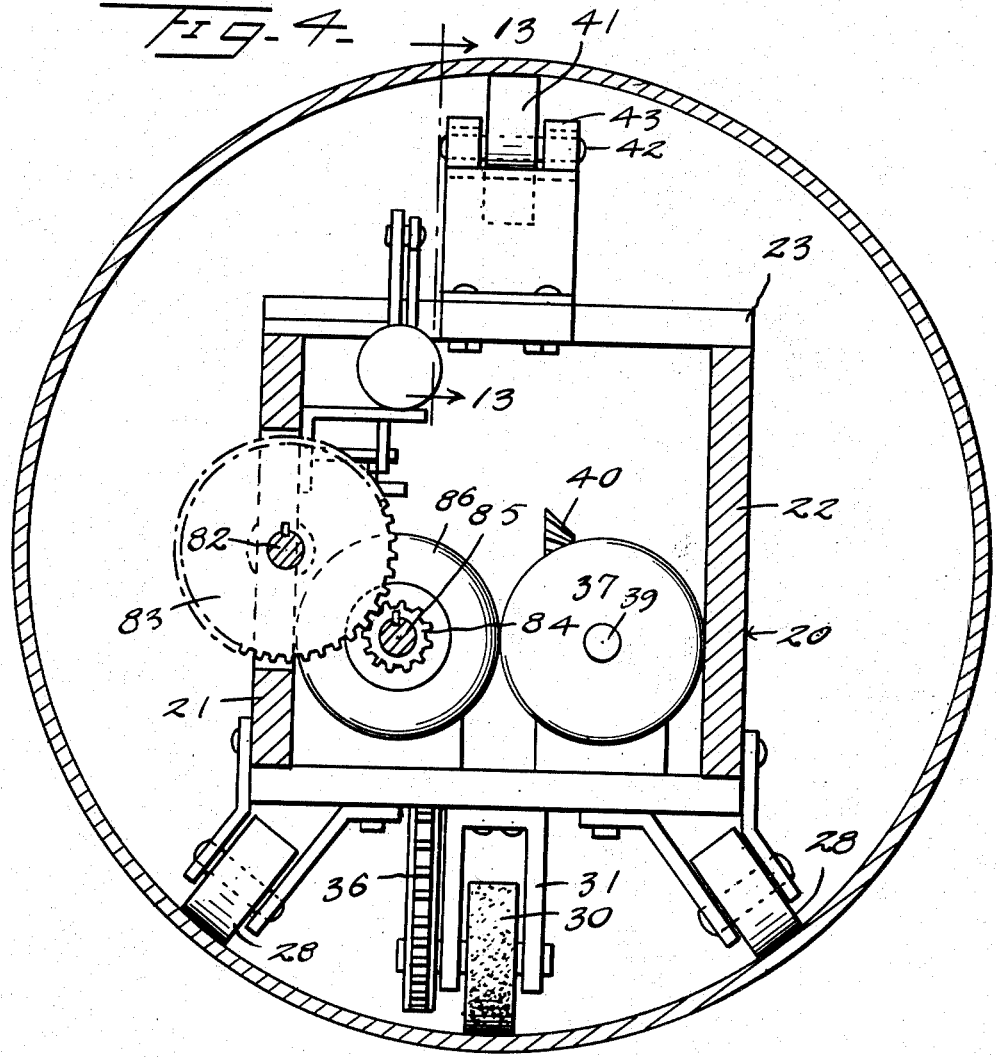
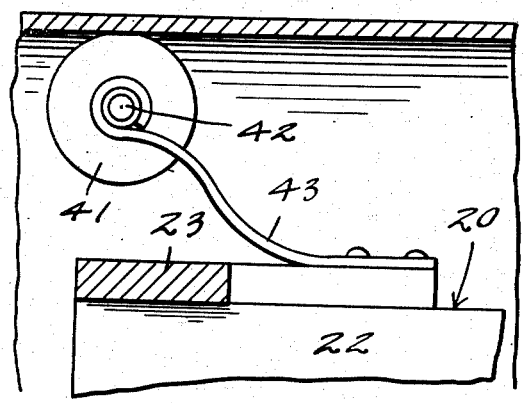

May 12, 1953 H. A. MEARNS 2,638,069
PIPE ALIGNING DEVICE
Filed July 6, 1950 7 Sheets-Sheet 5
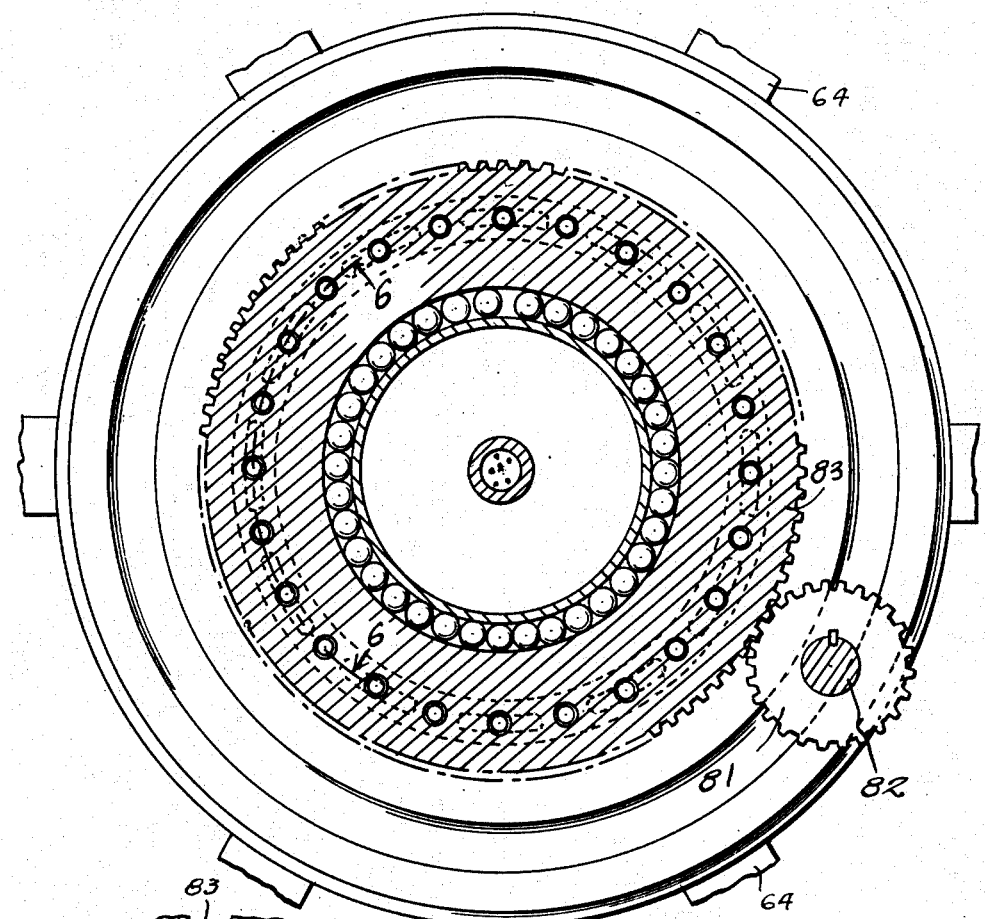
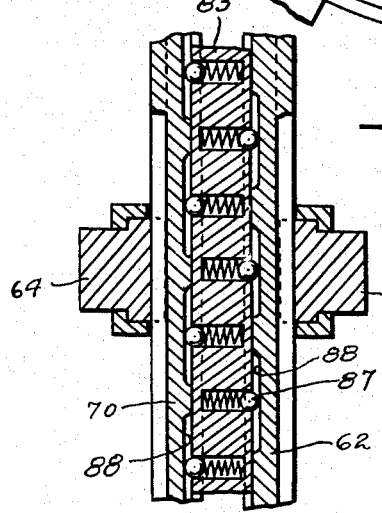
INVENTOR
H.A. Mearns
BY Kimmel & Crowell
ATTORNEYS May 12, 1953
H. A. MEARNS
2,638,069
PIPE ALIGNING DEVICE
Filed July 6, 1950
7 Sheets-Sheet 6
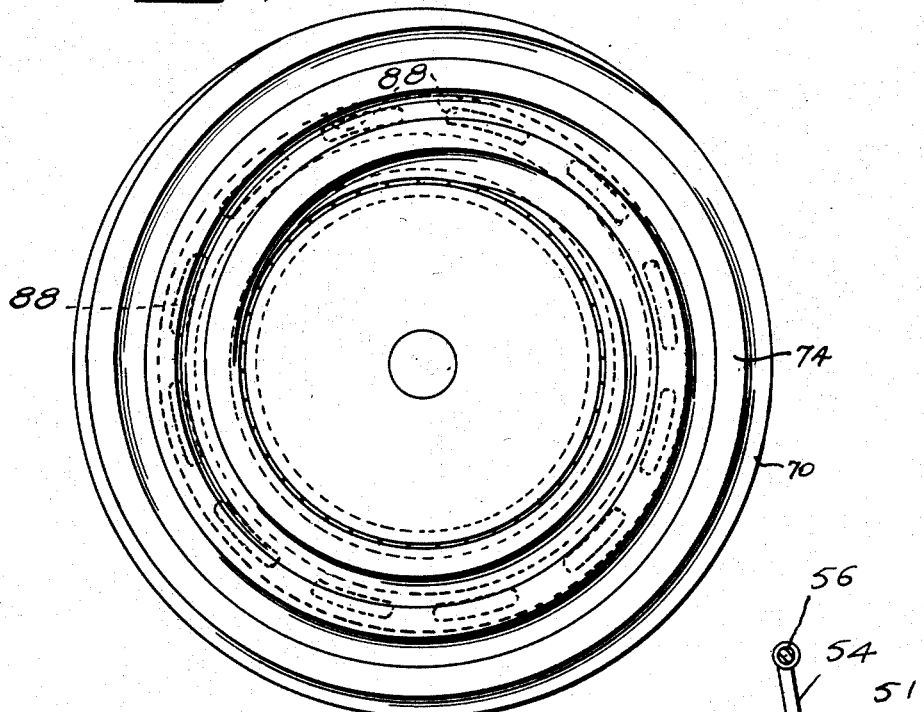
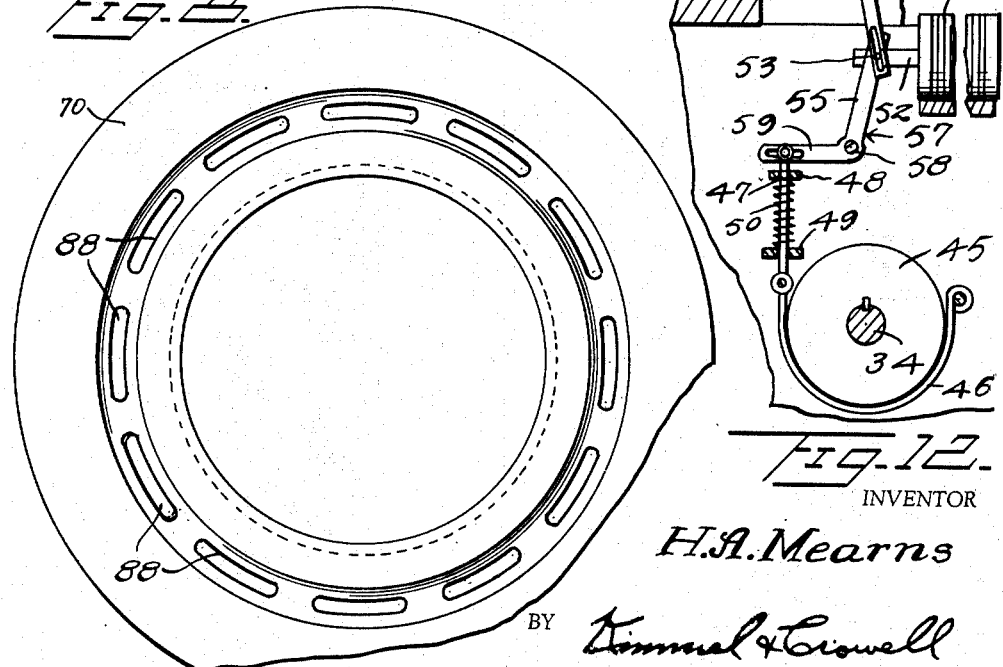
INVENTOR
H. A. Mearns
BY
Kimmel & Crowell
ATTORNEYS May 12, 1953 H. A. MEARNS 2,638,069
PIPE ALIGNING DEVICE
Filed July 6, 1950 7 Sheets-Sheet 7
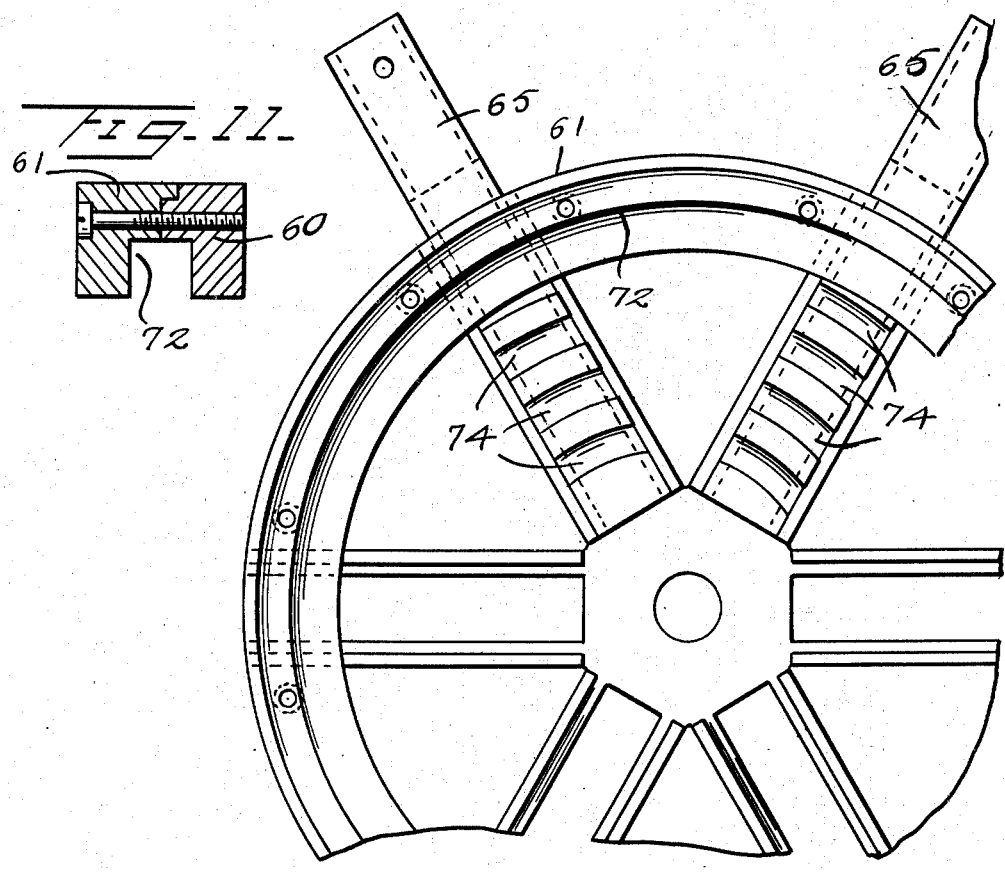
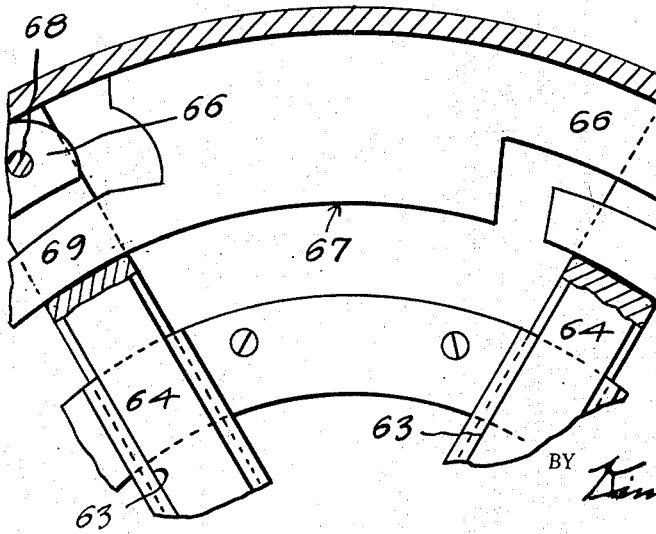
INVENTOR
H. A. Mearns
BY
Kimmel & Crowell
ATTORNEYS Patented May 12, 1953

2,638,069

UNITED STATES PATENT OFFICE 2,638,069

PIPE ALIGNING DEVICE

Herbert A. Mearns, Elkins, W. Va.

Application July 6, 1950, Serial No. 172,327

2 Claims. (Cl. 113—103)

This invention relates to a pipe aligning device for aligning a pair of abutting pipe sections to provide for welding the pipe sections together.

An object of this invention is to provide a pipe aligning device which is insertable within one pipe section and is provided with an extending portion for engagement with an abutting pipe section, the device including clamping means for clamping the abutting sections together.

Another object of this invention is to provide a device of this kind which embodies a mobile frame so constructed and arranged that after a pair of pipe sections have been welded together the device may be released from the welded sections and moved forwardly to a succeeding welding operation.

A further object of this invention is to provide a device of this kind which will tightly clamp abutting pipe sections together, with substantially the same clamping pressure on both pipe sections irrespective of any slight variation in the diameters of the pipe sections.

A further object of this invention is to provide a device of this kind which is electrically operated and includes an electric motor for driving the device forwardly within a pipe section, and also includes a second motor adapted when the device is in aligning position to effect outward movement of the clamping elements to a pipe clamping position.

A further object of this invention is to provide a device of this kind which will place an equal pressure on both of the pipe sections so that there will not be undue stress on one section by reason of variation in pipe diameter, which has heretofore resulted in the cracking of the joint or a portion of the pipe adjacent the joint.

The device herein disclosed is designed for exterior welding of the pipe sections, but it will be understood that the device can be readily adapted for interior welding of the pipe sections.

With the above and other objects in view, my invention consists in the arrangement, combination and details of construction disclosed in the drawings and specification, and then more particularly pointed out in the appended claims.

In the drawings,

Figure 1 is a detailed side elevation, partly broken away and in section, of a pipe aligning device constructed according to an embodiment of this invention, Figure 2 is a plan view of the device partly broken away and in section, Figure 3 is a sectional view taken on the line 3—3 of Figure 2, Figure 4 is a sectional view taken on the line 4—4 of Figure 2, Figure 5 is a fragmentary sectional view taken on the line 5—5 of Figure 2, Figure 6 is a fragmentary sectional view taken on the line 6—6 of Figure 2, Figure 7 is a detailed end elevation of one of the spiral clamp operating members, Figure 8 is an inner side elevation of one of the clamp operating members, Figure 9 is a fragmentary end elevation of the device with certain ones of the slides removed and with the clamping shoes removed, Figure 10 is a fragmentary sectional view taken transversely through the device, showing several clamping shoes in clamping position, Figure 11 is a fragmentary sectional view taken on the line 11—11 of Figure 3, Figure 12 is a fragmentary sectional view taken on the line 12—12 of Figure 2, Figure 13 is a fragmentary sectional view taken on the line 13—13 of Figure 4, Figure 14 is a diagrammatic view showing the electric circuits embodied in this invention.

Referring to the drawings, the numeral 20 designates generally a mobile frame which is formed of opposite side members 21 and 22 connected together at their rear by an upper connecting member 23, and connected together at their forward ends by a lower connecting member 24. The frame 20 is adapted to be inserted into a length of pipe section 25 which is adapted to be welded to an abutting pipe section 26. Initially the device may be manually inserted within the pipe section 25 and after the two sections 25 and 26 are welded together at the weld joint 27, the device is moved forwardly as will be hereinafter described.

The frame 20 has secured to the forward portion thereof a pair of wheels 28 carried by bearings 29, and the wheels 28 are engageable with the inner surface of a pipe section. A rear traction or driving wheel 30 is rotatably supported below the frame 20 by bearings 31, and a sprocket 32 is secured to the shaft 33 which is also fixed relative to the traction wheel 30. A transversely disposed shaft 34 is journalled between the side members 21 and 22 and has a sprocket 35 fixed thereto.

A chain 36 is trained about the sprockets 32 and 35 so that the driving wheel 30 will be rotated with rotation of shaft 34. A frame moving motor 37 is fixed within the frame 20 and a bevelled gear 38 is fixed to the armature shaft 39 thereof. A bevelled gear 40 is fixed to the shaft 34 so that shaft 34 will be rotated with rotation of shaft 39. A pressure applying roller 41 is rotatably carried by a shaft 42 which is carried by an elongated flat spring 43 fixed to a transversely disposed cross bar 44 which is fixed to the upper edges of side members 21 and 22. The pressure applying roller 41 is disposed at the rear of the frame 20 and is provided so that traction roller 30 will be placed under sufficient pressure to move the device forwardly within a pipe section after one section has been welded to another.

In order to provide a means whereby the frame 20 may be stopped at the desired point adjacent one end of a pipe section, a brake drum 45 is secured to shaft 34 and a brake band 46 engages about the drum 45 and has connected therewith a rod 47, as shown in Figure 12, which is slidable in guide 49 which is fixed relative to frame 20. A washer 48 is fixed relative to the rod 47 and a spring 50 engages about the rod 47, bearing at one end against the washer 48 and at the opposite end against the guide 49. Spring 50 constantly urges the brake band 46 to braking position.

A solenoid 51 is fixed in the frame 20 and has a movable core 52 connected by means of a pin 53 to the overlapping ends of a pair of links 54 and 55. Link 54 is pivotally mounted on a pivot 56 carried by the frame 20, and link 55 comprises one side of a bellcrank generally designated as 57. The bellcrank 57 is rockably mounted on a pivot 58 which is fixed relative to the frame 20 and the other side 59 of bellcrank 57 is connected with the rod 47. When the brake band 46 is in released position the two links 54 and 55 will be in substantially aligned position, but when solenoid 51 is energized and core 52 is moved to the left, as viewed in Figure 12, right angular arm 59 will be lowered, thereby pushing the band 46 into released position.

A head generally designated as 60 is fixed to the forward end of the frame 20 and is formed of a pair of circular plates 61 and 62. The plates 61 and 62 are of like construction and each plate is formed, as shown in Figure 3, with a plurality of radially disposed guide channels 63 within which slide bars 64 slidably engage. The outer ends of the slide bars 64 are bifurcated, as indicated at 65, and one end 66 of a clamping shoe 67 is pivotally secured to a slide 64 by a pivot 68. Each clamping shoe 67 is formed at the end thereof opposite from the end 66 with an extension or slide bar 69 which engages between the bifurcations 65 inwardly from the end 66.

The set of clamping shoes 67 comprise the inner set which is engageable within pipe section 25 closely adjacent the outer ends of the pipe section, and a second set of clamping shoes 67a similar to the shoes 67, are pivotally carried by radially disposed slide members 65a similar to slide members 65. The clamping shoes 67a are engageable within the adjacent end of pipe section 26 which is disposed in abutting relation with respect to pipe section 25. There is a substantial space between the slides 65 and 65a and the shoes 67 and 67a so that these shoes and the slides will not be unduly heated during the welding of the joint between the two pipe sections. The slides 65 and 65a are radially moved inwardly and outwardly by means of a pair of operators 70 and 71 which are disposed in the space 72 formed between the head plates 61 and 62.

The operator 70 is formed with a spiral thread 73 on its inner face which engages in spiral threads or grooves 74 formed in the outer sides of the slides 65. Operator 71 is formed with spiral threads 75 engageable in spiral grooves 76 formed in the inner sides or faces of slides 65a. The two operators 70 and 71 are formed as rings and are rotatably mounted on a pair of stationary plates 77 fixed centrally with respect to the head member 60.

Anti-friction balls 78 are interposed between the inner peripheries of the operators 70 and 71 and the outer peripheries of the hub plates 77. A ring gear 79 is rotatably disposed between the two operators 70 and 71, engaging anti-friction balls 80 interposed between the inner edge of gear 79 and the periphery of hub plates 77. Gear 79 is provided on its outer edge with spur teeth which are engageable with a pinion 81 secured to a shaft 82 journalled through the head member 60 and projecting inwardly with respect to the frame 20.

A gear 83 is also fixed on the shaft 82 and a smaller spur gear 84 fixed to an armature shaft 85 of a clamp operating motor 86 meshes with gear 83. The ring gear 79 is adjustably locked to the slide operators 61 and 62 by means of a plurality of circumferentially spaced apart spring-pressed locking balls 87 which are carried by the ring gear 79 and engage in elongated keeper grooves or recesses 88 formed in the inner faces of the operators 70 and 71. The spring-pressed locking members 87 which are constructed in the form of balls, are provided so that in the event one pipe section should be of a diameter different from the other pipe section, the ring gear 79 may continue rotation after the clamping shoes of one set tightly engage the adjacent pipe section in order that the clamping shoes within the other pipe section may be moved outwardly to a firm clamping position.

In the use and operation of this device, the frame 20 is initially inserted into the first pipe section, with clamping shoes 67 disposed adjacent one end of the pipe section, as shown in Figure 2. The next pipe section, such as pipe section 26, is then moved endwise over shoes 67 and is disposed in abutting and contacting relation with the adjacent end of pipe section 25. Motor 86 is then energized by closing a remotely disposed switch 90 so that ring gear 79 will be rotated to expand the brake shoes 67 and 67a to a pipe clamping position. In the event one pipe section is slightly larger in diameter than the other pipe section, the over-riding locking members 87 will permit outward movement of the shoes within the larger pipe section while the shoes in the smaller pipe section will remain stationary.

After the weld has been completed at the joint 27, motor 37 may be energized by means of a switch 91 which is also remotely positioned with respect to the frame and which is connected with motor 37 by wires extending entirely through the pipe section 26. Operation of motor 37 will cause the device to move lengthwise through pipe section 26 until the device reaches the end of pipe section 26, whereupon motor 86 may be operated to expand the clamping shoes.

At the same time motor 37 is energized solenoid 51 which is in the same circuit with motor 37, will be energized so that brake member 46 will be released. When motor 37 is cut off to stop travel of the device, brake band 46 will be applied by spring 50 so as to hold the machine in proper position for application of the pipe clamping and aligning members.

It will be understood, of course, that before motor 37 is energized to move the device forwardly, motor 86 will be operated so as to withdraw the clamping members 67 and 67a inwardly to a released position.

I do not mean to confine myself to the exact details of construction herein disclosed, but claim all variations falling within the purview of the appended claims.

What I claim is:

1. A pipe aligning and clamping device for use in welding together the abutting ends of a pair of pipe sections comprising a mobile frame, pipe clamping means comprising a plurality of arcuate shoes adapted to engage the interior of one pipe section carried by said frame engageable with one pipe section, a second pipe clamping means comprising a plurality of arcuate shoes adapted to engage the interior of the other pipe section carried by said frame in spaced relation to said first clamping means, a clamping means operator engaging between said clamping means, said clamping means operator comprising a pair of spaced ring members having spiral teeth on their outer faces, a ring gear mounted coaxially and in engagement with said ring members, a plurality of radially disposed guides carried by said frame, a plurality of reciprocal movable slide rods having spiral grooves in their inner faces mounted in said guide members, said slide rods being in engagement with each ring member, means connecting each shoe to and between two adjacent slide rods, spring loaded balls positioned between said ring gear and each ring member to provide an over-running clutch between said operator and said first and second clamping means, and driving means for said operator.

2. A pipe aligning and clamping device for use in welding together the abutting ends of a pair of pipe sections comprising a mobile frame, a head at one end of said frame, pipe clamping means comprising a plurality of arcuate shoes adapted to engage the interior of one pipe section carried by one side of said head, a second pipe clamping means comprising a plurality of arcuate shoes adapted to engage the interior of the other pipe section carried by the other side of said head spaced from said first clamping means, a clamping means operator positioned between said clamping means, said clamping means operator comprising a pair of spaced ring members having spiral teeth on their outer faces, a ring gear mounted coaxially and in engagement with said ring members, a plurality of radially disposed guides carried by said head, a plurality of reciprocal movable slide rods having spiral grooves in their inner faces mounted in said guide members, said slide rods being in engagement with each ring member, means connecting each shoe to and between two adjacent slide rods, spring loaded balls positioned between said ring gear and each ring member to provide an over-running clutch between said operator and said first and second clamping means, and driving means for said operator.

HERBERT A. MEARNS.

References Cited in the file of this patent

UNITED STATES PATENTS

| Number | Name | Date |
|---|---|---|
| 1,751,077 | D'Ardenne | Mar. 18, 1930 |
| 1,938,819 | Eskilson | Dec. 12, 1933 |
| 2,043,020 | Thiemer | June 2, 1936 |
| 2,205,002 | Tripp | June 18, 1940 |
| 2,452,867 | Price et al. | Nov. 2, 1948 |
| 2,463,158 | De Lorme et al. | Mar. 1, 1949 |
| 2,525,680 | Ingermarson | Oct. 10, 1950 |
| 2,587,940 | Webster | Mar. 4, 1952 |
| 2,594,000 | Elliott | Apr. 22, 1952 |